US004001702B2

United States Statutory Invention Registration [19]

[11] Reg. Number: H1702

Esman et al.

[45] Published: Jan. 6, 1998

[54] WIDEBAND FIBER-OPTIC SIGNAL PROCESSOR

[76] Inventors: Ronald D. Esman, 5924 Ridge Ford Dr., Burke, Va. 22015; Lew Goldberg, 3316 Midland Rd., Fairfax, Va. 22031; Edward Alexander, 2001 Hopewood Dr., Falls Church, Va. 22043; Keith J. Williams, 827 Chatsworth Dr., Accokeek, Md. 20607

[21] Appl. No.: 369,437

[22] Filed: Jan. 6, 1995

[51] Int. Cl.[6] ..... H04B 10/02; H04B 10/04; H04B 10/06

[52] U.S. Cl. ..... 359/154; 359/180; 359/189

[58] Field of Search ..... 359/161, 180, 359/181, 182, 183, 189, 154

[56] References Cited

U.S. PATENT DOCUMENTS

| | | | |
|---|---|---|---|
| 4,498,179 | 2/1985 | Waynes et al. | 372/27 |
| 4,588,255 | 5/1986 | Tur et al. | 350/76 |
| 5,227,908 | 7/1993 | Henmi | 359/181 |
| 5,287,212 | 2/1994 | Cox et al. | 359/161 |
| 5,361,155 | 11/1994 | Chiaroni et al. | 359/131 |
| 5,373,383 | 12/1994 | LaGasse | 359/182 |

OTHER PUBLICATIONS

Miller, "Characteristics and Applications of High Performance, Tunable, Fiber Fabry–Perot Fillers", *Electronic Components,* 1991, pp. 489–492.

Williams et al, "Observation of Photodetector Nonlinearities,"Elec. Ltrs., vol. 28, No. 8, pp. 731–732, 1992.

Day et al., "30 Hz–Width, Diode–Laser–Pumped Nd:GGG Nonplanar Ring Oscillotors by Active Frequency Stabilization," Elec. Ltrs., vol. 25, No. 13, pp. 810–812, 1989.

Yue et al., "Fibre Ring Resonator with Finesse of 1260," Elec. Ltr, vol. 24, No. 10, pp. 110–111, 1988.

Bowers et al., "Filter Response of Single–Mode Fibre Recirculating Delay Lines," Elec. Ltrs, vol. 18, No. 3, pp. 110–111, 1982.

Stokes et al., "All–Single–Mode Fibre Resonator," Opt. Ltrs, vol. 7, No. 6, pp. 288–290, 1982.

*Primary Examiner*—Bernarr E. Gregory

[57] ABSTRACT

In the transmission electrical signals using an optical carrier the signal power carried by an optical carrier is proportional to the optical power. High optical power levels are desired for optical carriers that are modulated by weak electrical signals, however, significant unmodulated power is left in the original carrier after processing. To maximize the radio frequency (RF) signal power generated by a given (maximized) photodetector current (for a given input power), in this invention, the optical carrier power is reduced. This is accomplished by the addition of a narrow-band optical filter, such as a Fabry-Perot filter, to reduce the average optical carrier power without reducing the modulation sidebands, which results in an increased modulation depth. Therefore, greater RF and microwave power is generated by a photodetector with the same photocurrent. With a laser source exhibiting a beam whose linewidth is narrow compared to the filter bandwidth, the filter is tuned, or frequency locked, to match the filtering resonance with the optical carrier wavelength. With the high finesse filter and narrow-linewidth laser beam, the frequency range of operation is extended from the filter half-bandwidth to the next resonance of the filter. Thus, broadband effective gain results without introducing additional noise.

7 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WIDEBAND FIBER-OPTIC SIGNAL PROCESSOR

BACKGROUND OF THE INVENTION

1. Field of the Invention

This invention deals generally with the transmission of electrical signals using an optical carrier and more particularly with a method of transmission of electrical signals by reducing the unmodulated optical carrier power so that amplifiers and high-power optical sources may be used to generate higher radio-frequency powers from a photodetector.

2. Description of the Related Art

In the basic externally modulated optical communications link 10, shown in FIG. 1, an optical signal 12 generated by a continuous-wave laser source 14 is directed through an external optical modulator (EOM) 16 whose output 18 depends sinusoidally on the input radio-frequency (RF) or electrical signal 22. Recently, laser 14 powers have reached the 20 to 100 mW level and the optical insertion loss of EOMs 16 range from 3 to 10 dB so that the output 18 from the EOMs 16 can be as high as 10 mW. If the optical fiber connecting the EOM 16 to the high-speed photodetector 24 is not too long or not too lossy, the optical power incident on the photodetector 24 is essentially 10 mW. Ten milliwatts of optical power on the photodetector 24 is likely to destroy the photodetector 24 or at least introduce large-signal distortions, which include harmonics and bandwidth reductions in the RF or electrical signal output 28. Therefore an optical attenuator 26 must be used, which negates the usefulness of the high-power laser 14 by reducing the input optical power 12 and, thus, increasing the insertion loss.

To achieve linearity and maximum differential change in optical output per input voltage in the basic externally modulated optical communications link 10, the EOM 16 is typically biased at the point at which the output is one-half of the maximum output signal, called "quadrature." When biased at quadrature, the EOM 16 optical output signal 18, $P_{output}$ is given by $$P_{output} = \frac{P_{input}}{2}\,[1 \pm \sin(kx)]$$

where $P_{input}$ is the input optical power, k is a constant, x is the input signal voltage, and the sign (±) depends on the slope of the quadrature point chosen. The sinusoidal function introduces nonlinear distortion in the signal unless the modulated depth is kept below about 71% which corresponds to approximately 20% reduction (1 dB compression) of the output signal modulation relative to a perfectly linear relationship, i.e., $P_{output} \propto P_{input}$. The modulation depth, M, is defined as $$m = \frac{P_{max} - P_{min}}{P_{max} + P_{min}} \tag{2}$$

When kx is small the output signal can be approximated with $$P_{output} = \frac{P_{input}}{2}\,[1 + kx] \tag{3}$$

where the positive sign is taken without loss in generality. This equation can be rewritten as $$P_{output} = P_{excess} + \frac{P_{mod}}{2}\,[kx_{average} + kx] \tag{4}$$

The second component of the right hand side is a sum of the signal kx which may be positive or negative and just enough of the input optical carrier 12 ($kx_{average}$) to ensure the modulation depth of this component does not exceed 100%. The first part of this equation $P_{excess}$ is called the "excess carrier" and represents the unmodulated optical power. If viewed as a separate optical component, this excess carrier increases the signal from a photodetector 24 since it acts like a coherent high-power local oscillator. However, this signal "gain" is linearly proportional to the excess carrier power, which is limited by the photodetector 24 to 1 to 10 mW. The excess optical power is detrimental in two ways. First, optical amplifiers are rendered useless since they are limited by the average output power and, therefore, cannot be used to only boost the modulated optical wave without amplifying the excess carrier. Second, and more importantly, the average optical power must be kept below ~1 mW to avoid signal reductions and distortions in the photodetector 24 and below ~10 mW to avoid damage to the photodetector 24.

The electrical link loss can roughly be calculated as follows. For comparison purposes, the input electrical power is set to one-fourth of the half-wave voltage, Vπ/4, which yields a modulated depth, m, of 71%. The electrical input power then is $$P_{\mu W,output} = \frac{\left(\frac{V_\pi}{4}\right)^2}{2R_{INPUT}} \tag{5}$$

where $R_{INPUT}$ is the load resistance. The radio frequency (RF) output power 28 from the photodetector 24 is calculated from the peak modulation current, $m \cdot I_{PD,aver}$, and is given by $$P_{\mu W,output} = \frac{m^2 I_{PD,aver}^2 R_{LOAD}}{2} \tag{6}$$

where $R_{LOAD}$ is the load resistance. The link loss is the ratio of the output electrical power to the input electrical power. Therefore, the fiber optic link transmission coefficient is proportional to the photodetector 24 average current squared. Also, for high-speed photodetectors 24 with average current limited to 1 mA, the minimum loss of a conventional link is approximately 37 dB (assuming that the input and output load resistances to be 50 Ω and that the EOM 16 has a $V_\pi$=10 Volts). However, weak input signals do not provide 71% modulation depth, therefore the link loss is much higher for these signals than 37 dB.

In the prior art, the excess carrier, and the dc photocurrent it produces, have been ignored because the average power has been less than 1 mW. However, recently, there have been significant advances in laser output levels, high-speed modulators, optical amplifiers, and small high-speed photodetectors. Because of the small active volume, high-speed photodetectors cannot receive more than ~1 mW of optical power before nonlinearities, bandwidth reduction, or catastrophic damage occurs. As a result, high-power (~100 mW) lasers cannot be fully utilized to increase high-speed modulator sensitivity. New photodetector designs may increase the power handling capability, but, so long as the optical power available is larger than the photodetector power limit, this invention offers advantages and utility.

SUMMARY OF THE INVENTION

The object of this invention is to reduce the unmodulated carrier power so that amplifiers and high-power laser sources can be used to generate higher radio frequency (RF) power output by the photodetector.

Another object of this invention is to provide a device for generating a higher RF power output by photodetectors that can be added to existing fiber-optic signal processing systems with minor system modifications.

In fiber-optic signal processing systems having the optical signal modulated by relatively weak electrical signals, high optical power levels are desired because the signal power carried by the optical carrier is proportional to the optical power. However, weakly modulated optical waves leave significant unmodulated power in the original carrier. This invention provides an apparatus for reducing the unmodulated carrier power of an optical signal processor so that amplifiers can be used to provide higher power levels in the output RF signal from a photodetector. Other optical and optoelectronic devices that exhibit optical power limits (including optical amplifiers, themselves) will benefit or exhibit increased utility as a result of reduced optical carrier power.

To maximize the signal power carried by the modulated optical carrier, the input optical power to an external modulator is maximized. In this invention a narrowband optical filter, tuned to match the filtering resonance with the optical carrier wavelength, is used causing the average optical carrier to be reduced, but not the modulation sidebands, thereby causing the modulation depth to increase. Therefore, the concurrent increase in detector signal level is accomplished without adding noise to the signal.

DESCRIPTION OF THE PREFERRED EMBODIMENT

This invention is an improvement upon the fiber optic signal processors of the prior art.

Figure 1:
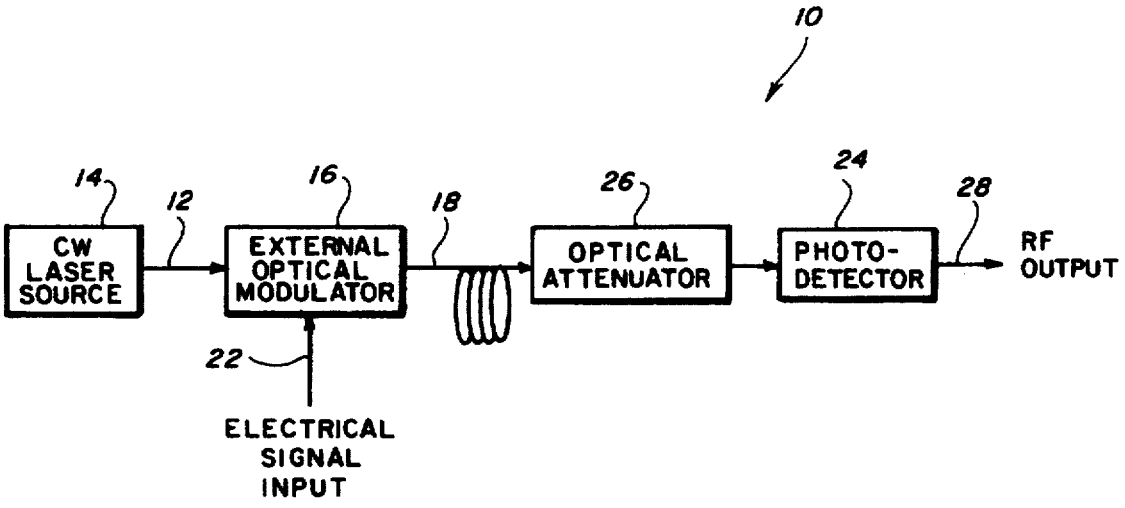
PRIOR ART FIG. 1
FIG. 1 shows the basic externally modulated optical communications link described in the prior art.
Figure 2:
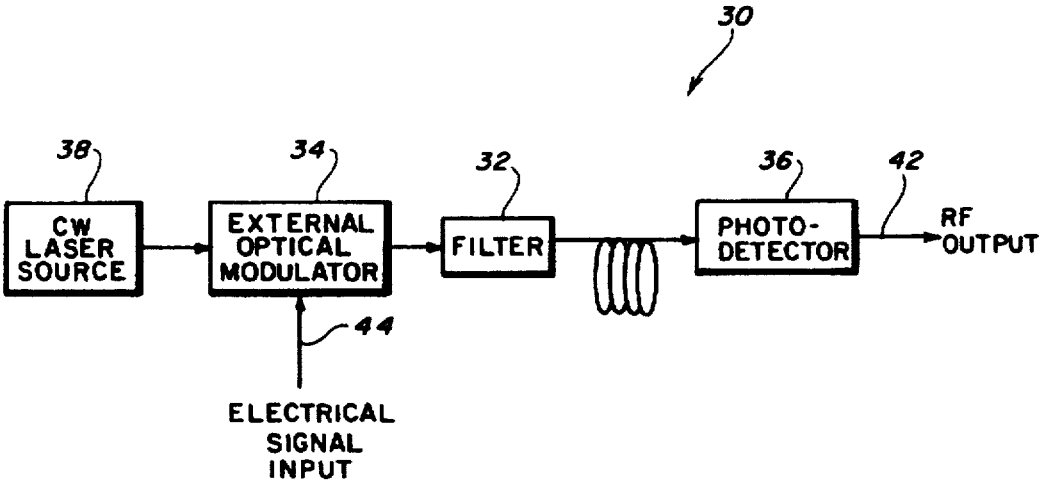
FIG. 2 shows the preferred embodiment of the invention utilizing a narrowband filter instead of an optical attenuator used in the prior art.

In the preferred embodiment of this invention, FIG. 2, the basic externally modulated optical communications link 30 has a narrowband filter 32, separate from the laser 38, inserted between the external optical modulator (EOM) 34 and the photodetector 36. The narrowband filter 32 may be of any type well known to the art, but preferably a Fabry-Perot (FP) filter having finesse, $\Im$, in the 30–250 range with filter bandwidths extending from ~50 MHz to 400 GHz and a free spectral range (FSR) ranging from 10 GHz to 12,500 GHz. Finesse, $\Im$, being FSR/BW and a measure of the spectral resolving power of the FP filter. A FP filter having a finesse of as high as 150 is used as a passband filter in the transmission mode and a notch filter in the reflection mode. In the FP filter 32, the "reflected" signal is the signal of interest and is accessed by, preferably, an optical circulator (not shown) prior to the filter 32 and then forwarded to the rest of the fiber-optic link. A fiber-optic coupler (Not shown) may also function to extract the reflected signal from the FP filter 32.

A second preferred narrowband filter 32 is the fiber optic ring resonator (FORR) filter which operates as a notch filter in an equivalent "reflection" mode. The highest currently known finesse of a passive fiber ring resonator is 1260. In a FORR filter, the "reflected" signal is the signal of interest as it contains the optical sidebands and a substantially reduced optical carrier. The "transmitted" output signal would be the optical carrier extracted from the modulated optical signal. Also, a FORR filter may include a gain element to improve the finesse.

Figure 3A:
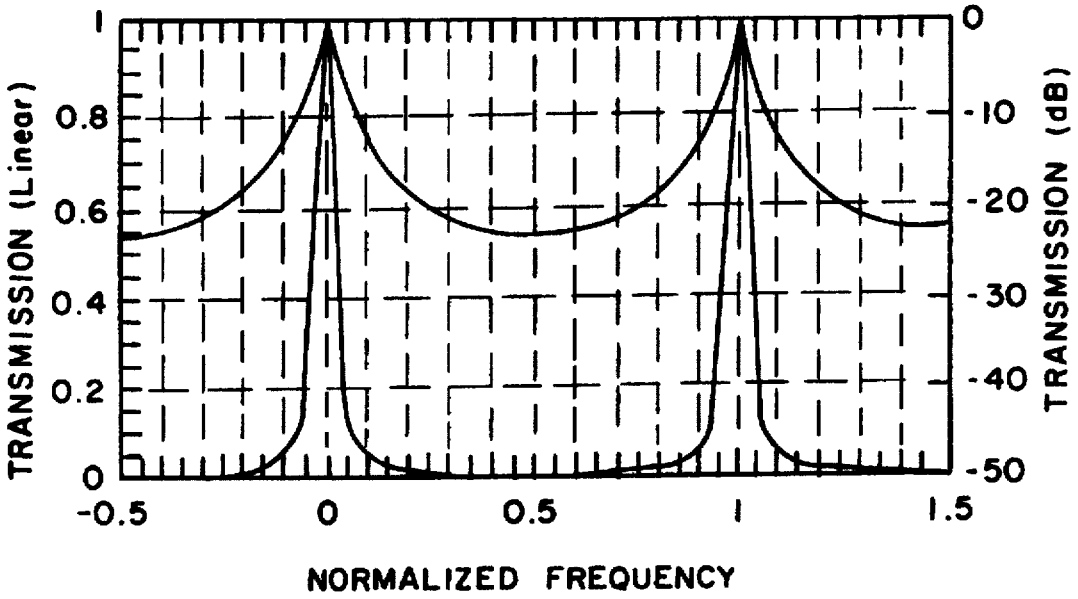
FIG. 3*a* shows the plot of a typical resonator transmission, $T(\omega')$, versus normalized optical frequency for a fiber optic ring resonator (FORR).
Figure 3B:
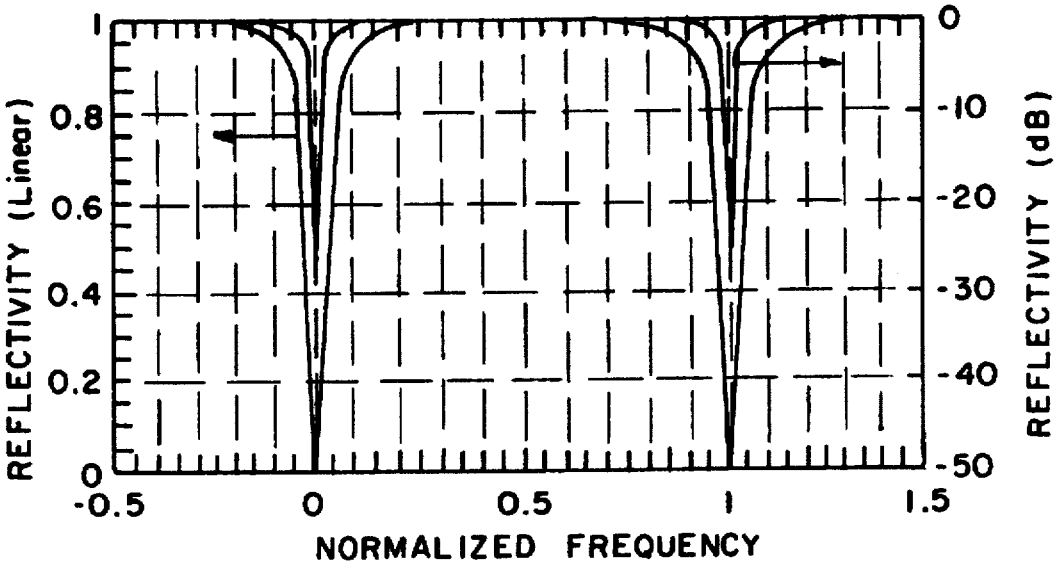
FIG. 3*b* shows the plot of a typical resonator reflection, $R(\omega')$, versus normalized optical frequency for a fiber optic ring resonator.

Utilizing a continuous wave laser source 38 capable of generating an optical carrier exhibiting a linewidth that is narrow compared to the filter 32 bandwidth, the filter is tuned, or frequency locked to the laser source 38, by matching the filtering resonance with the optical carrier wavelength by any technique currently known to the art. A typical method of frequency locking the optical carrier and the filter 32 is described in Day et al., 30 *Hz-Linewidth, Diode-Laser-Pumped, Nd:GGG Nonplanar Ring Oscillators by Active Frequency Stabilization,* Electronics Letters, Vol 25, No. 13, pp 810–812, June 89. The optical carrier would then have an integer number for the normalized frequency and the sidebands would have a normalized frequency ~0,02 to ),50 away from the carrier (depending on filter finesse and performance desired). As shown in FIGS. 3*a* and 3*b*, the optical carrier is them transmitted and the sidebands are reflected. The resonator transmission, $T(\omega')$, FIG. 3*a*, and reflection, $R(\omega')$, FIG. 3*b*, versus normalized optical frequency $\omega=\omega \cdot nL/2\pi c$ is derived in Stokes et al., *All-single-mode Fiber Resonator,* Optics Letters Vol. 7, No. 1, pp 288–290, January 82. With a high finesse ($\Im$) and a narrow-linewidth optical carrier, the frequency of operation extends from the filter half-bandwidth (~100 MHz) to the next resonance of the filter (>20 GHz). Other modulator 34 and filter 32 combinations are possible, e.g., a Mach-Zehnder filter may be used in conjunction with a phase modulator.

Figure 4:
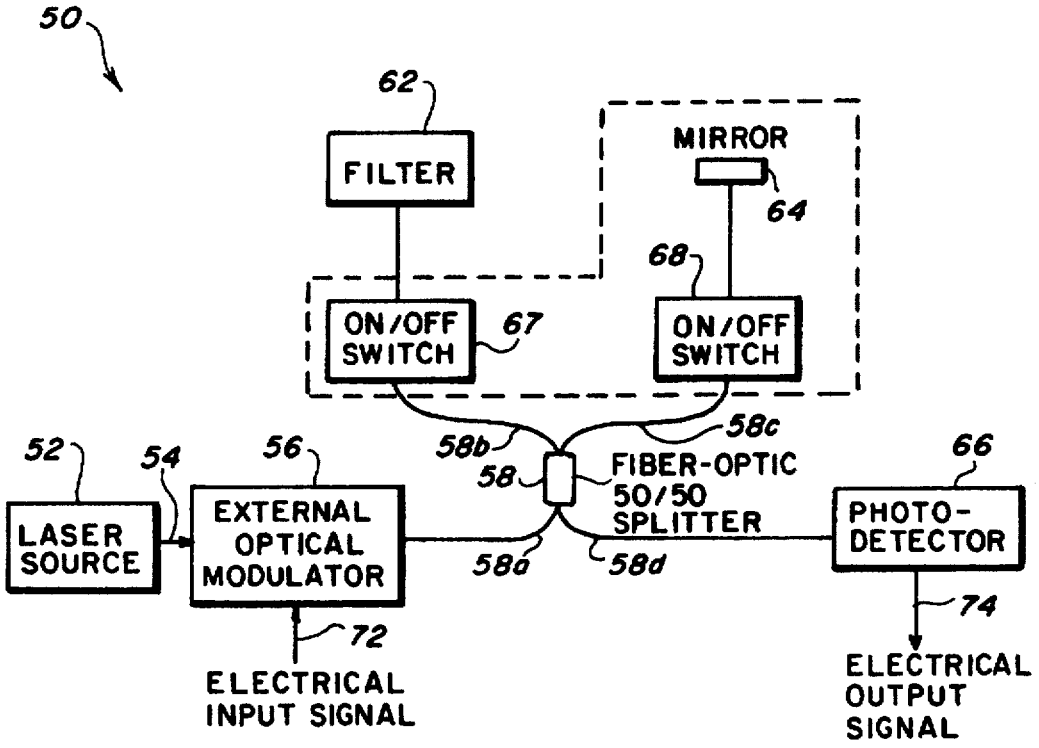
FIG. 4 shows the experimental model of an optical signal processor utilizing a Fabry-Perot filter.

In an experimental model, FIG. 4, the output of the laser source 52 (a 1.3 micron Nd:YAG laser Model 120, manufactured by Lightwave Electronics of Mountain View, Calif.) is coupled into a polarization maintaining single mode optical fiber 54 feeding an external optical modulator (EOM) 56 (i.e., a lithium niobate modulator with 18 GHz bandwidth manufactured by United Technologies of Bloomfield, Conn.). The modulated optical signal from the EOM 56 is directed to input port 58*a* of a fiber-optic 50/50 splitter 58 (3 dB directional coupler); preferably the 50/50 splitter 58 would be replaced by an optical circulator. The optical signal entering the splitter 58 is split into two output signals. The first output signal is applied through port 58*b* to a filter 62 (used in reflection mode). The filter utilized in the experimental installation was a Fixed Fiber Fabry-Perot Filter, Model FFP-100, manufactured by Micron Optics, Inc. of Atlanta, Ga., with a free spectral range of 75 GHz and a bandwidth at 1.3 microns of ~360 MHz, yielding a finesse of over 200. The second output signal is applied through port 58*c* to a mirror 64 providing a reference optical signal. The reflected optical signal from the filter 62 and the mirror 64 reenter the splitter 58 through ports 58*b* and 58*c*, respectively, and 50% of each reflected signal is directed through output port 58*d* to a photodetector 67. Two On/Off switches 66 and 68 are inserted in the filter and mirror circuits, respectively, and are made of lengths of optical fiber that, for the Off condition, are tightly wound around small mandrels (not shown)—the bend loss of the fiber results in complete extinction of the optical signal.

Figure 5:
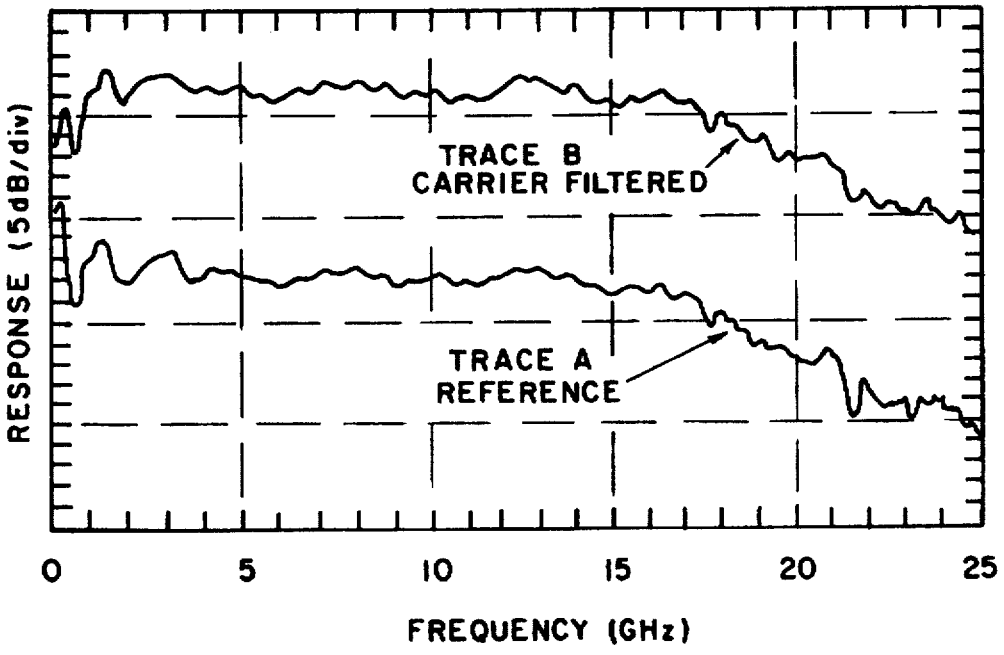
FIG. 5 shows a plot of the reference frequency response of the fiber-optic link from the electrical input to electrical output of the experimental model of an optical processor utilizing a filter.

The experiment consisted of first switching Off the signal reflected from the filter 62 by the use of switch 67 and measuring the reference frequency response of the fiber-optic link from the electrical input 72 to electrical output 74, shown as Trace "A" in FIG. 5. The reference signal is then switched Off by the use of switch 68 and switch 67 is placed in the On position to allow the reflected signal from the filter 62 to enter the splitter 58. The optical light from the laser source 52 (the optical carrier) is tuned to a filter 62 resonance for maximum transmission and minimal reflection. If there is no noticeable relative drift between the filter 62 resonance and the wavelength of the optical light from the laser source 52, frequency locking is not required. The optical power of the light from the laser source 52 is then adjusted to yield a photodetector 66 average current equal to the photodetector 66 average current used in the reference measurement. The carrier response is then measured and is shown as Trace "B" in FIG. 5. Shown in FIG. 5 is over a 9 dB improvement in electrical output signal over the reference measurement represented by trace "A". In the experimental installation, the signal enhancement is limited to 9 dB because of the residual carrier reflections from the filter 62. Improved filters or multiple filters, can increase the signal enhancement to greater than 20 dB. It is noted that in this experiment the 9 dB gain was exhibited over the full bandwidth from about 500 MHz to 25 GHz.

The foregoing apparatus provides a unique and novel way to reduce the loss in fiber-optic signal processing and communications systems. In this invention the user is allowed great freedom in the choice of components but is required to assure optical locking between the laser and filter. By an appropriate choice of a filter 62, modulation can be carried out at any input frequency range with a corresponding reduction in link loss without introducing any additional noise, amplitude ripple, or phase distortion such as that found when microwave amplifiers are used to increase the microwave signal 74. Unlike microwave amplifiers, this apparatus offers a very broadband amplification representing a substantial cost and power saving in the overall link. With this apparatus, and the same photodetector current as a conventional link, greater microwave power is generated by the photodetector, hence, greater radio frequency output powers are obtained when a saturating optical beam is applied to the photodetector. Even if the modulation depth of an optical source is large (~100%), in some applications, a continuous wave optical signal (or optical carrier) is added to the well-modulated optical carrier as part of the signal processing. This apparatus allows removal of the excess carrier, if desired for additional signal processing, even when the excess carrier is not origionally due to poor modulation depth. Further, in this apparatus the incoming modulation can be phase modulated and, with an appropriate filter (i.e., Mach-Zehnder), simultaneously convert the phase to amplitude modulation as well as filters the optical carrier resulting in an increase to the modulation depth.

Although the invention has been described in relation to exemplary preferred embodiments thereof, it will be understood by those skilled in this art that still other variations and modifications can be affected in these preferred embodiments without detracting from the scope and spirit of the invention.

What is claimed is:

1. A signal processor comprised of:

means for generating optical signal;

means for generating a first electrical signal;

means for modulating the optical signal with said first electrical signal to produce a modulated optical signal;

a narrow-band optical notch filter for use in both the transmission and reflection modes having a finesse in the 30–250 range with a bandwidth from approximately 50 MHz to 400 GHz and a free spectral range from 10 GHz to 12,500 GHz to sharply filter the modulated optical signal;

means for transmitting the filtered modulated optical signal; and means for converting the filtered modulated optical signal into a second electrical signal.

2. A signal processor, as in claim 1, wherein said means for generating an optical signal is a continuous-wave laser.

3. A signal processor, as in claim 1, wherein said narrow-band notch optical filter is a fiber optic ring resonator.

4. A signal processor, as in claim 1, wherein said narrow-band notch optical filter is a Fabry-Perot filter.

5. A signal processor, as in claim 1, wherein said means for converting the filtered modulated optical signal into a second electrical signal is a photodetector.

6. A signal processor comprised of:

a light source for generating an optical signal;

a first electrical signal:

said first electrical signal and optical signal being applied to an external optical modulator wherein said optical signal is modulated by said first electrical signal to produce a modulated optical signal;

a narrow-band optical notch filter for use in both the transmission and reflection modes having a finesse in the 30–250 range with a bandwidth from approximately 50 MHz to 400 GHz and a free spectral range from 10 GHz to 12,500 GHz to increase the modulation depth of the optical signal thereby producing a modulated optical signal;

a predetermined length of optical fiber receiving the modulated optical signal from the filter; and a detector on the opposing end of the length of optical fiber from the filter converting the modulated optical signal to a second electrical signal.

7. A method for processing an optical signal comprised of the steps of:

generating a continuous wave optical signal;

modulating the continuous wave optical signal with a first electrical signal producing a modulated optical signal;

filtering the modulated optical signal with a narrow-band optical notch filter for use in both the transmission and reflection modes having a finesse in the 30–250 range with a bandwidth from approximately 50 MHz to 400 GHz and a free spectral range from 10 GHz to 12,500 GHz to filter to sharply increase the modulation depth of the modulated optical signal, and converting the filtered modulated optical signal into a second electrical signal.

* * * * *